(12) United States Patent
Kroeger et al.

(10) Patent No.: US 9,070,211 B1
(45) Date of Patent: Jun. 30, 2015

(54) WEBVIEW TAG FOR A SANDBOXED MULTIPROCESS BROWSER

(71) Applicant: Google Inc., Mountain View, CA (US)

(72) Inventors: Robert John Kroeger, Kitchener (CA); Fady Samuel, Kitchener (CA); Darin W. Fisher, Mountain View, CA (US); Erik Kay, Belmont, CA (US)

(73) Assignee: Google Inc., Mountain View, CA (US)

( * ) Notice: Subject to any disclaimer, the term of this patent is extended or adjusted under 35 U.S.C. 154(b) by 157 days.

(21) Appl. No.: 13/841,210

(22) Filed: Mar. 15, 2013

Related U.S. Application Data

(60) Provisional application No. 61/715,450, filed on Oct. 18, 2012.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06T 11/00* | (2006.01) | |

(52) U.S. Cl.
CPC ............. *G06T 11/00* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 7,836,303 | B2* | 11/2010 | Levy et al. .................... | 713/168 |
| 2005/0256837 | A1* | 11/2005 | Kira ................................ | 707/1 |
| 2009/0028432 | A1* | 1/2009 | Rossato et al. ................ | 382/173 |
| 2009/0158140 | A1* | 6/2009 | Bauchot et al. ............... | 715/234 |
| 2009/0164581 | A1* | 6/2009 | Bove et al. .................... | 709/205 |
| 2009/0287824 | A1* | 11/2009 | Fisher et al. .................. | 709/226 |
| 2011/0296419 | A1* | 12/2011 | Dumas et al. ................. | 718/101 |
| 2012/0054261 | A1* | 3/2012 | Evans et al. ................... | 709/203 |

OTHER PUBLICATIONS

"browser", XUL Reference, Mozilla Developer Network, May 25, 2012, 7 pages.
"iframe", XUL Reference, Mozilla Developer Network, May 29, 2011, 3 pages.

* cited by examiner

*Primary Examiner* — H S Sough
*Assistant Examiner* — William C Wood
(74) *Attorney, Agent, or Firm* — Brake Hughes Bellermann LLP

(57) ABSTRACT

A computer-implemented method executed by at least one processor performs operations for a web browser running a browser process and at least one renderer process on a computing system. The method includes identifying a webview tag in a web page, the web page being associated with the at least one renderer process. The method also includes forking another renderer process responsive to identifying the webview tag, generating a mapping between the at least one renderer process and the other renderer process at the browser process, and using the browser process as an intermediary for communications between the at least one renderer process and the another renderer process based on the mapping.

20 Claims, 9 Drawing Sheets

WEBVIEW TAG FOR A SANDBOXED MULTIPROCESS BROWSER

RELATED APPLICATIONS

This application claims priority under 35 U.S.C. §119 to Provisional Patent Application Ser. No. 61/715,450, entitled "BROWSER TAG FOR A SANDBOXED MULTIPROCESS BROWSER" filed on Oct. 18, 2012. The subject matter of this earlier filed application is hereby incorporated by reference

TECHNICAL FIELD

This disclosure generally relates to embedded documents in a sandboxed, multi-process browser environment.

BACKGROUND

The user interface for web-browsers often include tabs, where each tab represents a different web page or document that the user has accessed. Many browsers may use a single process to run the browser and tabs, yet some browsers are multi-process, so that each tab runs as a separate, sandboxed process. Browsers having such a multi-process environment generally include a main process, or browser process, that controls all the other processes, in a star-like pattern. In a sandboxed, multi-process browser, the child processes (or tabs) do not communicate with each other. This provides a more secure web-surfing environment because what is happening in one tab cannot access or affect the contents of another tab or the computing device in general.

A webview tag is a mark-up language element that allows a web page to embed another web page or other document. Embedded web pages, for example from a browser tag or a similar elements, such as an iframe, have been available for traditional browsers, but not running as an independent process in a sandboxed, multi-process browser. This is because the embedded web page, also known as the guest, runs as its own process, and, therefore, should not be able to communicate directly with the embedder web page and vice versa to maintain the sandbox for each process. But the embedder web page may need to send events to the guest to properly embed and render the guest within its content. Events represent user-interaction with the document, such as scrolling, mouse clicks, etc.

SUMMARY

One aspect of the disclosure can be embodied in a computer-implemented method executed by at least one processor performing operations for a web browser running a browser process and at least one renderer process on a computing system. The method may include identifying a webview tag in a web page, the web page being associated with the at least one renderer process and forking another renderer process responsible for the content embedded by the webview tag. The method may further include generating a mapping between the at least one renderer process and the other renderer process at the browser process, and using the browser process as an intermediary for communications between the at least one renderer process and the another renderer process based on the mapping.

One aspect of the disclosure may be embodied in a computing device that includes at least one processor, a memory, a display device, and instructions stored in the memory that, when executed by the at least one processor cause the computing device to perform operations. The operations may include running a browser process, the browser process generating data used to display a window on the display device and running one or more renderer processes. The renderer processes may be forked and controlled by the browser process. One of the renderer processes is an embedder process that has an associated guest process, and the guest process is another one of the renderer processes. The renderer processes have storage isolation with respect to each other and each renderer process that is not the guest process represents a content area in the window. Furthermore, the browser process acts as an intermediary for communications between the guest process and the embedder process.

These and other aspects can include one or more of the following features. For example, the instructions may further including instructions that cause the computing device to perform operations that include detecting, by the browser process, an event for the embedder process and sending a message from the browser process to the embedder process notifying the embedder process of the event. The embedder process may determine that the event is destined for the guest process and, in response, send the event to the browser process. The browser process may forward the event to the guest process. In such an implementation the operations may also include handling the event at the guest process, returning an acknowledgement to the browser process, and sending a message from the browser process to the embedder process indicating that the guest handled the event. In some implementations the operations may also include determining, by the browser process, whether a predetermined amount of time has elapsed since forwarding the event to the guest process without receiving the acknowledgment, terminating the guest process when it is determined that the predetermined amount of time has elapsed, and sending a message from the browser process to the embedder process notifying the embedder process that the guest was terminated.

In some implementations, the event includes changing information for display and handling the event includes writing, by the guest process, first display information to a first area of memory shared between the guest process and the browser process, copying, by the browser process, the first display information from the first area of memory to a second area of memory shared by the browser process and the embedder process, writing, by the embedder process, second display information to the second area of memory, the second display information including the first display information and notifying the browser process that the second area of memory is ready for display, and providing, by the browser process, the second display information to the display.

In another aspect, a computer-implemented method executed by at least one processor performs operations for a web browser running a browser process and at least one renderer process on a computing system. The method includes identifying a webview tag in a web page, the web page being associated with the at least one renderer process. The method also includes forking another renderer process responsive to identifying the webview tag, generating a mapping between the at least one renderer process and the other renderer process at the browser process, and using the browser process as an intermediary for communications between the at least one renderer process and the another renderer process based on the mapping.

In some implementations, using the browser process for communications can include sending first display data from the another process to the browser process, using the mapping to determine that the another process is mapped to the at least one renderer process, sending the first display data from the browser process to the at least one renderer process, incorporating the first display data into second display data at the at least one renderer process, sending the second display data to the browser process, and using the second display data to generate a window in a display device. In some implementations, using the browser process for communications includes receiving an event at the browser process, sending the event to the at least one renderer process, determining that the event is directed to the another process, sending the event to the browser process for forwarding to the another renderer process, handling the event at the another renderer process, sending an acknowledgement including first data from the another renderer process to the browser process, and sending the first data from the browser process to the at least one renderer process.

In another aspect, a non-transitory computer-readable medium contains instructions executable by at least one processor, the instructions causing at least one renderer process and a browser process running on the computing system to perform operations. The operations may include identifying a webview tag in a web page, the web page being associated with the at least one renderer process and forking another renderer process responsive to identifying the webview tag. The operations may also include generating a mapping between the at least one renderer process and the another renderer process at the browser process, and using the browser process as an intermediary for communications between the at least one renderer process and the another renderer process based on the mapping. In some implementations, using the browser process for communications includes sending first display data from the another process to the browser process, using the mapping to determine that the another process is mapped to the at least one renderer process, sending the first display data from the browser process to the at least one renderer process, incorporating the first display data into second display data at the at least one renderer process, and sending the second display data to the browser process. In some implementations, using the browser process for communications includes generating, by the another process, first display data in a particular memory location, using the mapping to determine that the another process is mapped to the at least one renderer process, sending a token identifying the particular memory location to the at least one renderer process, using the token, by the at least one renderer process, to modify the particular memory location with second display data; and using the particular memory location to generate a window in a display device. In some implementations the window is a window from a browser application that looks like a native application:

Another aspect of the disclosure may be embodied in a non-transitory computer readable medium containing instructions that perform any of the methods described above.

Advantages of the disclosure include, for example, enabling a webview tag to operate in a multi-threaded, sandboxed browser.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Systems and methods described here provide a communication system that embeds a guest into another renderer process while still maintaining a sandboxed, multi-processor browser model. Implementations allow the guest to remain isolated from the storage of its embedder process and from other renderer processes. In other words, the guest cannot access storage or information used for other renderer processes. Furthermore, the guest does not know it is running as an embedded object, which allows web pages and other documents that want to run as a top-level frame to run as an embedded guest process. Moreover, communications between the guest, embedder, and browser occur with no significant changes to the HTML rendering engine used by the browser. An example of such an HTML rendering engine is WebCore, a publicly-available document object model library, or WebKit, a layout engine used, for example, in Safari® and Chrome™.

In some implementations, the guest process and the embedder process communicate through the browser process. This enables the guest and embedder to run as independent processes, maintaining the sandbox and other security features, while enabling the embedder to receive and respond to events occurring within the guest. A sandbox is a security mechanism for separating running processes. A sandboxed process has access to limited resources and generally has restricted or no access to input and output devices. For example, a sandboxed process may have permission to write to and read from specific areas of memory. To accomplish the communication, the embedder process and browser process may use browser plug-in objects to facilitate communications between the embedder and guest. Because the guest does not know it is an embedded object, the browser process may also create and maintain a mapping of each guest process to its embedder process to facilitate directing messages from the guest back to the embedder. Implementations may preserve the sandboxing of the processes but allow the embedder to receive the information it needs without significant changes to the HTML rendering engine.

Figure 1:
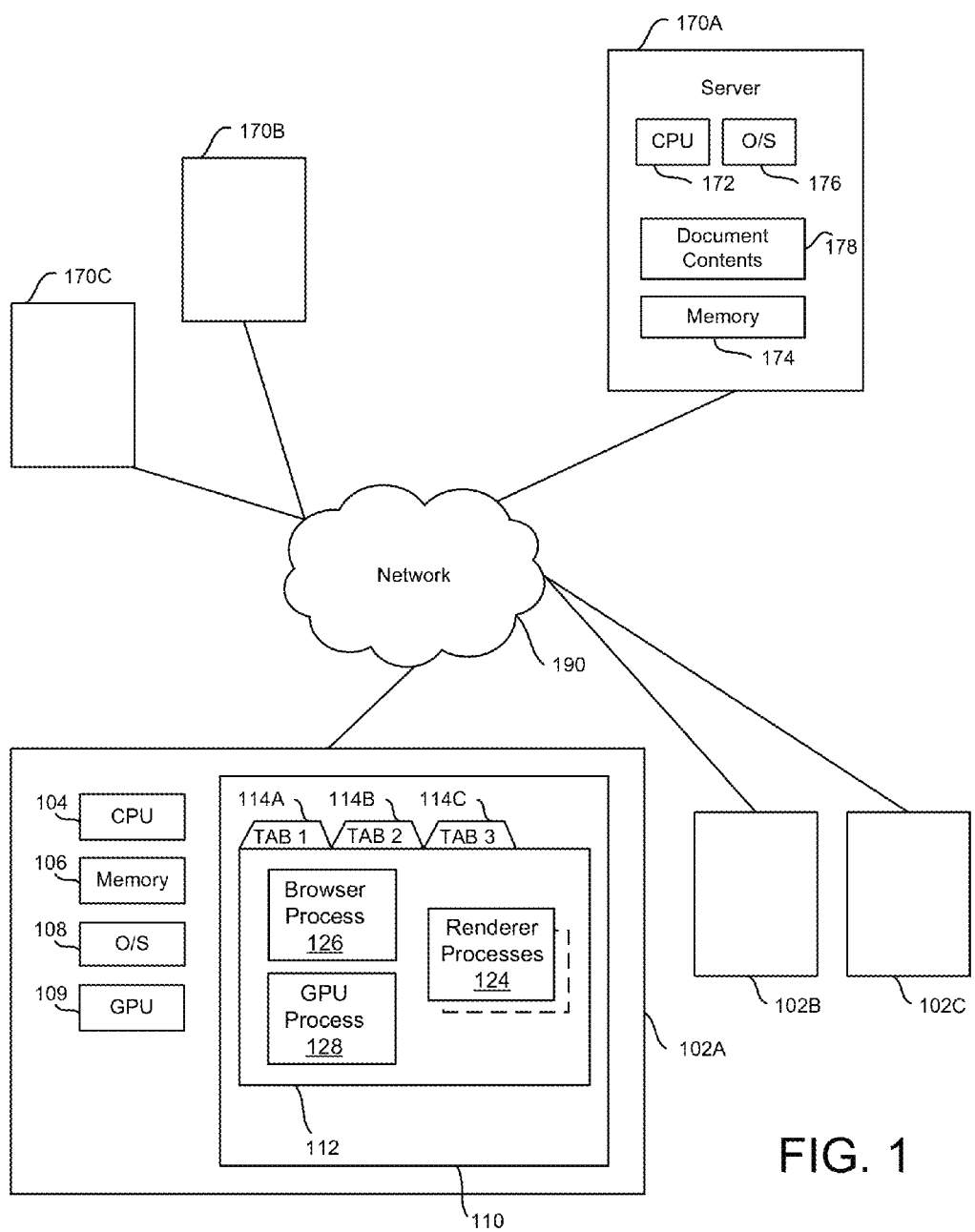
FIG. 1 is a schematic diagram of a system for allowing a webview tag in a multi-process browser.

FIG. 1 is a schematic block diagram of an example implementation of a system 100 that may provide a webview tag in a multi-process, sandboxed browser environment. In various implementations, the system 100 may include client computing devices 102A, 102B, 102C (such as desktop computers, notebook computers, netbook computers, tablet computers, smart-phones, televisions with at least one processor, etc.). A client computing device 102A can include one or more processors (CPU) 104 and one or more memories 106. The client computing device 102A can execute an operating system (O/S) 108 and various applications (110) which may display a user interface window (e.g., web browser 112). Some client computing devices 102A may include a graphics processing unit (GPU) 109 to speed up the rendering of graphics on a display device.

In one implementation, the client computing device 102A may be running or causing the operating system 108 to execute application 110 or web browser 112. In various implementations, this web browser 112 may include a plurality of panes, windows, or tabs 114A, 114B, 114C. The web browser 112 can be a visual area, for example rectangular, containing some kind of user interface. In a graphical user interface (GUI) used in the client computing device 102A, the web browser 112 can be a two-dimensional object arranged on a plane of the GUI known as the desktop. The web browser 112 can include other graphical objects outside of a web page or working area, for example, that may be called the "chrome" of the web browser, e.g., a menu-bar, toolbars, controls, or icons. The web browser may also include a working area in which a document, image, folder contents, or other main object can be displayed. The working area may generally hold one main object (i.e., in a single document interface) or more than one main object in a multiple document interface, such as a webview tag or related construct. In some applications, specifically web browsers or browser applications, multiple documents can be displayed in individual tabs 114A, 114B, 114C. In some implementations, these tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." In some implementations one or more of tabs 114A, 114B, and 114C may include an embedded web-page or other document object. The tabs 114A, 114B, and 114C may execute in separate renderer processes 124, each with its own individual memory. In some implementations, one or more of tabs 114A, 114B, and 114C may be browser applications that look and feel like a window for a native application rather than a tab within the browser window.

For example, in various implementations, the web browser 112 may include or be associated with one or more processes, such as browser process 126 and one or more renderer processes 124. A renderer process 124 is a process where web content is parsed, rendered, and where code, such as javascript, is executed. The browser process 126 may be the main process of the browser application and may include a user interface (UI) thread that receives and provides information for user-interaction with the browser tabs 114A, 114B, and 114C. The UI thread may also control all information output to the browser tabs 114A, 114B, and 114C. For example, the browser process 126 may receive events from tabs 114A, 114B, 114C, such as mouse clicks, touches, swipes, resizes, text entry, etc., and may render the graphical information displayed to the user in tabs 114A, 114B, and 114C. The browser process 126 may also have an input-output (I/O) thread for sending messages to and receiving messages from renderer processes 124. Some implementations with a GPU 109 may also include a GPU process 128 that works with browser process 126 to render browser tabs 114A, 114B, and 114C from information generated by browser processes 126.

Each tab 114A, 114B, and 114C may have a corresponding renderer process 124. For example, tab 114A may have a renderer1 process 124, tab 114B may have a renderer2 process 124 and tab 114C may have a renderer3 process 124. Renderer processes 124 may have an I/O thread for sending messages to and receiving messages from the browser process 126. Renderer processes 124 may also have a main thread for handling events and painting and, in some implementations, a compositor thread that works with the GPU process 128 to render information into tabs 114. In some implementations, browser 112 may sandbox renderer processes 124, so that renderer processes 124 cannot access the resources of computing device 102A, directly communicate with each other or with external servers, such as external server 170A, or access the resources of other renderer processes 124. Instead, the browser process 126 may control access to local resources and external servers for browser 112.

The client computing devices 102A, 102B, 102C may receive content from one or more server computing devices 170A, 170B, 170C, that may be connected to the client computing devices 102A, 102B, 102C through a network 190. Via the network 190, the computing devices 102A, 102B, 102C may communicate with the remote servers 170A, 170B, and 170C. Network 190 may be any computer network including an intranet or the Internet.

As shown in FIG. 1, the system 100 can also include one or more remote servers 170A, 170B, 170C, that include one or more processors 172, one or more memories 174, an operating system 176, and one or more documents 178. Documents 178 may be web-pages, word-processing documents, PDFs, spreadsheets, text files, pictures, source code, or any other content offered for viewing by third parties over the network 190.

Figure 2:
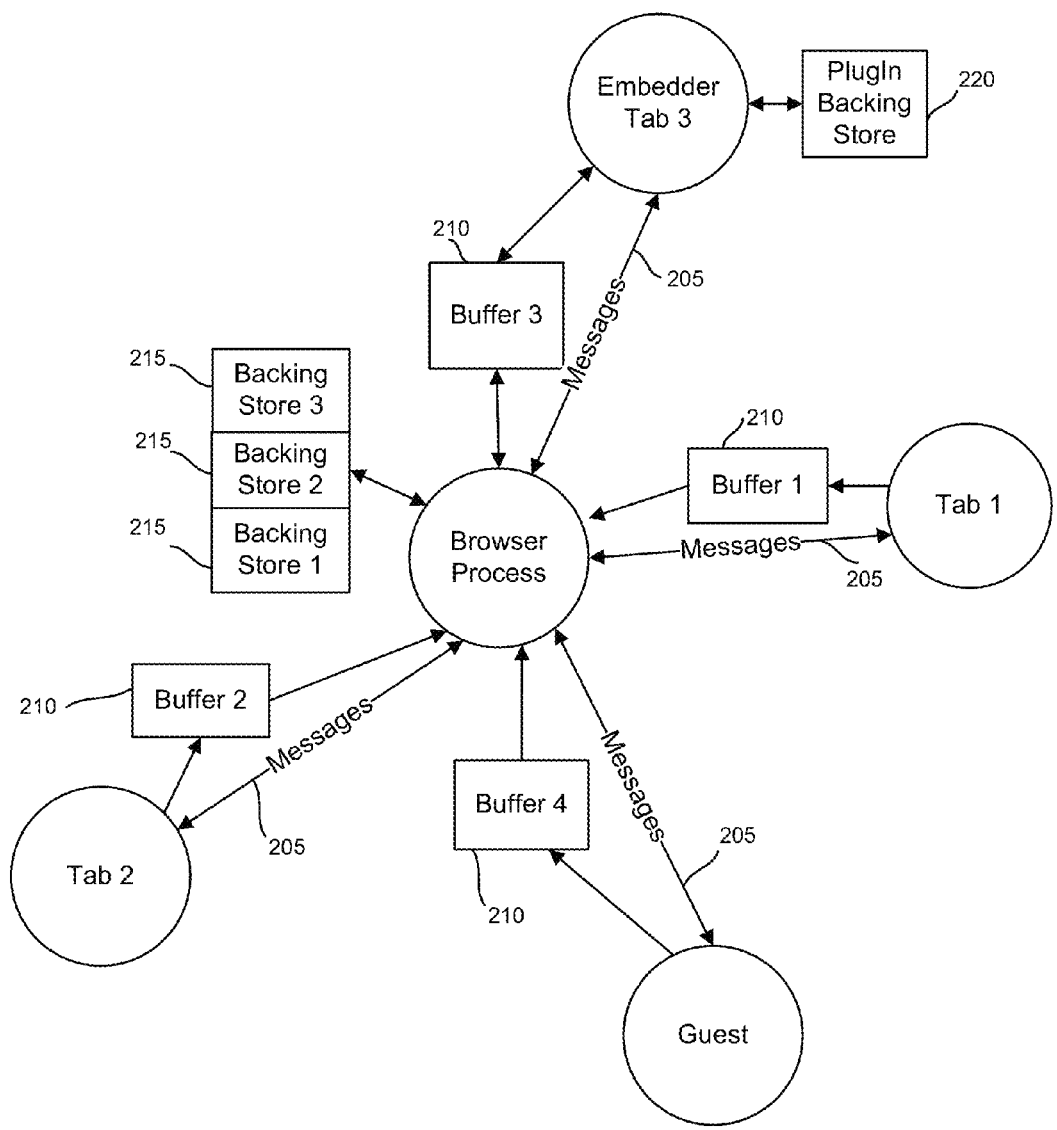
FIG. 2 is an architecture diagram of processes in a multi-process, sandboxed browser, including one guest process and one embedder process.

FIG. 2 is an architecture diagram of processes in a multi-process browser, including one guest process and one embedder process. An embedder is a web-page that contains a browser plugin activated by a webview tag, or some similar construct. For example, Tab 3 may include a webview tag in its source Hyper-Text Markup Language (HTML). A webview tag may be a web component that uses a shadow document object model (DOM) that contains a browser plugin. Thus, the webview tag may represent any construct that allows one web-page or other document to be embedded in the window or tab of another web-page.

As previously mentioned, renderer processes may correspond with a tab, window, or pane shown in the browser window. For example, Renderer processes 1, 2, and 3 may correspond to tabs 114A, 114B, and 114C of FIG. 1, respectively. Tab 3 may be an embedder process associated the guest process of FIG. 2. Thus, the document contents displayed by the guest process may appear in tab 114C of FIG. 1, along with the contents of the embedder renderer process 3. For example, tab 114C of FIG. 1 may include the web-page www.example.com that embeds a window for www.embeddedobject.org. The embedded document, also known as the guest, may run as a separate process, and may not have any indication that it has the role of a guest.

Renderer processes may communicate with the browser process by sending and receiving messages over communication channel 205, such as, for example, an inter-process communication (IPC) channel. In some implementations, when an event that is triggered from the guest window, for example as a result of user interaction within the guest window, the browser process may communicate the event to the embedder process using messages over channel 205. The embedder process may determine that the event was meant for the guest and notify the browser process, via, for example, channel 205. The browser process may send the event to the guest, where the event is handled. The guest may also return an acknowledgement to the browser process, and the browser process may notify the embedder process of the acknowledgement. In some implementations, for example those using asynchronous events, if the browser process does not receive the acknowledgement after a predetermined amount of time the browser process sends an event to the embedder process to indicate that the guest is unresponsive. If the guest process sends an acknowledgement after the predetermined amount of time, the browser process may send another event to the embedder to indicate that the guest is responsive again. In some implementations, for example those using synchronous events, while the guest handles the event the embedder process may be blocked and may not be allowed to forward any other messages to the guest. In such implementations, the browser process may unblock the embedder process if the guest process is unresponsive for a predetermined period of time.

Painting refers to rendering content area on a display device. To paint, or render, content within a tab, pane, or window, a browser may use software assisted rendering or hardware assisted rendering. Software assisted rendering may be used on any machine, but is slower than hardware assisted rendering. Hardware assisted rendering is faster, but requires a dedicated graphics processing unit, such as GPU 102. In software assisted rendering, a special area of memory 210, also referred to as a shared memory buffer, may be used to communicate painting information from a renderer process to the browser process. In some implementations, the painting information may be images. Alternatively, the painting information may include other drawing information. The painting information may be an entire frame worth of pixels or the painting information may be only the changed pixel regions. The painting information may also include scroll information indicating the number of pixels that are copied over on scrolling. The browser process may use the shared memory buffer to render the appropriate content area on the display device. When a renderer process desires to make a change to the information in the display, for example as part of handling an event, the renderer process may write to the memory buffer it shares with the browser process, notify the browser process that there is data to be painted, and then the browser process may read from the shared memory buffer to draw the tab. For example, in FIG. 2 if Tab 1 renderer process is handling a resize event, the Tab 1 renderer process may write information to Buffer 1 and the browser process may read the information from Buffer 1 to render the content area. In order to refresh a page quickly, the browser process may keep a copy of each shared memory buffer in a backing store 215. The backing store 215 may also reside in a memory of the computing device. For example, when the browser process reads the information from Buffer 1, it may also copy the information into backing store 1. The backing store 215 may allow the browser process to re-draw a particular content area quickly, with the last known information for the renderer process, without having to wait for a renderer process to completely render its display information. While the browser process may read and write to the backing store 215, renderer processes do not have access to the backing store 215.

To paint the content generated by an embedder process, the embedder must include the display information from the guest because the guest may be displayed as part of the embedder's content area or frame, such as a tab or window. In other words, the images for the guest process may be displayed to the user in the content area associated with the embedder process. But because of sandboxing, the embedder process cannot access the shared memory buffer of the guest to obtain this information. For example, Embedder Tab 3 of FIG. 1 cannot access Buffer 4. To allow an embedder access to the information it needs to render the guest, in some implementations, the browser process may share the contents of the shared memory buffer from the guest with the embedder process. For example, the browser may copy the contents of Buffer 4 to Buffer 3. The plugin backing store may store the contents of the guest process shared memory buffer at a point in time. This information may be given to the browser process from the guest, and then copied by the browser process to the memory buffer shared with the embedder, such as Buffer 3 in FIG. 2. In order to include the display information from the guest process, in some implementations, the embedder process may include a plugin backing store 220 for the guest. The embedder may copy the information from its shared memory buffer into the plugin backing store 220. The plugin backing store 220 allows the embedder to use the information from the guest to render its complete content area in the buffer 210 the embedder shares with the browser process, such as Buffer 3 of FIG. 2. The embedder process may read this information and copy it to the plugin backing store 220 that only the embedder process has access to. The browser process may then use Buffer 3 to render the embedder content area or frame, which will include the information from the guest process.

For hardware assisted rendering, a graphics processing unit (GPU) process receives rendering messages from the renderer processes directly and may create a texture map in a special memory location that contains the visual contents, or image, of the content area for the display. Display information for one particular point-in-time may be referred to as a frame. However, if a guest renders a frame, the GPU process needs additional information from the embedder to render the complete content area (e.g., tab or window). To obtain this information, the GPU process may send a token that identifies the texture map to the embedder. In some implementations the message may be sent on a special compositor thread to enhance performance. The texture map may have the information from the guest, and the embedder may add information to the texture map, so that the texture map contains the information to render the embedder and its guest to the display. For example, the embedder may combine the image from the guest with its image to produce a new image, or texture, in the texture map. When the embedder is finished, the GPU process may then use the texture map to render the image on the display device.

The lifetime of the guest may be controlled by the embedder process, the browser process, or both. Browser process control ensures the guest process does not cause the embedder process to hang or crash. When a guest process hangs, the browser process may kill the guest and notify its embedder. In some implementations, when a guest is killed or dies, the embedder process may generate a message that indicates the guest is unavailable or the embedder process may choose to spawn a new guest process. In some implementations, the embedder process may also hide the guest process when the embedder's content area is hidden and cause the browser to kill the guest process if the embedder navigates away from the page that contains the embedded guest.

Figure 3:
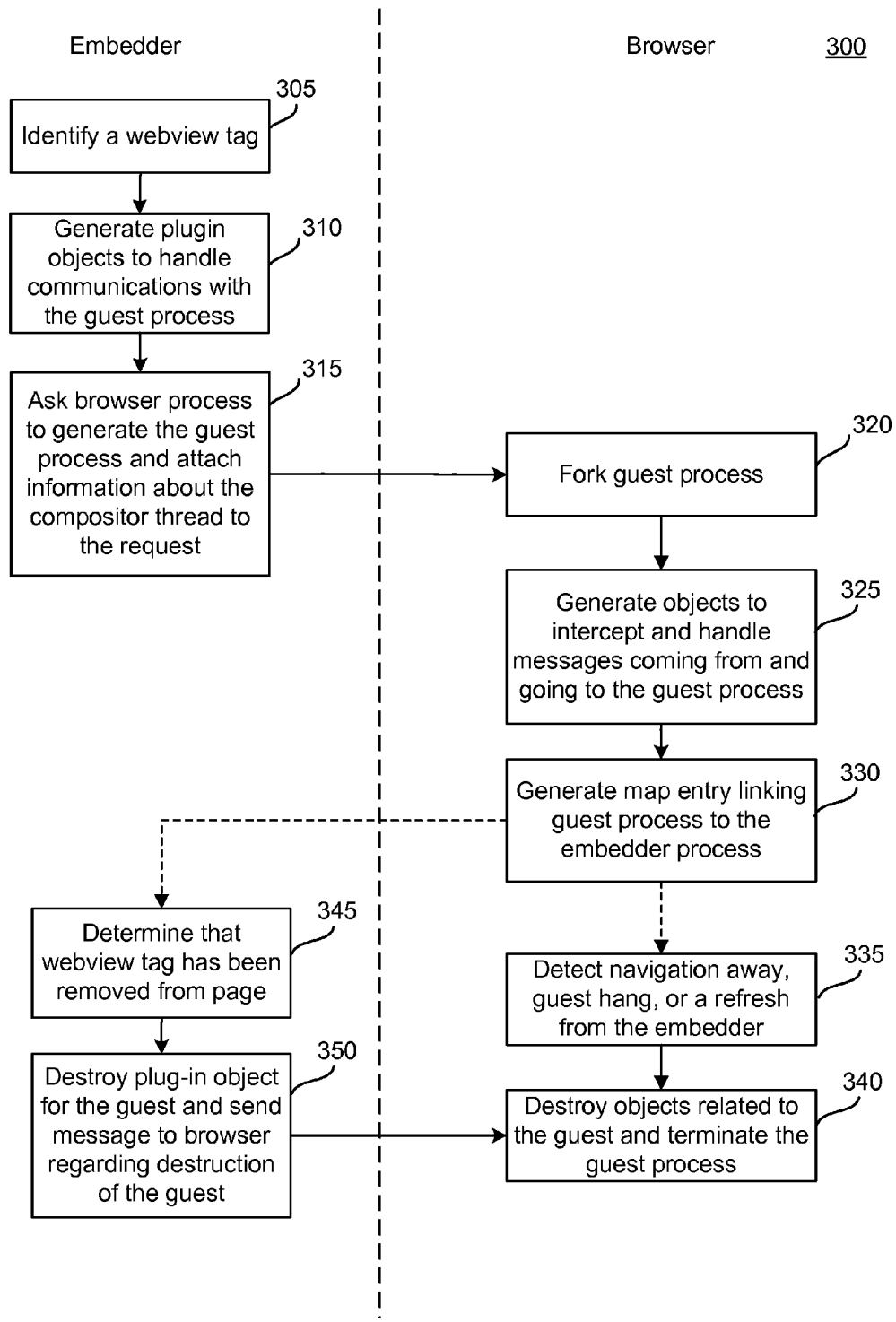
FIG. 3 is a flowchart of a process for creating a guest process in a multi-process browser.

FIG. 3 is a flowchart of a process 300 for creating a guest process in a multi-process, sandboxed browser. As discussed above, a renderer process may embed another browser window through the use of a webview tag or similar construct that contains a browser plugin. For example, as a renderer process processes the components of the document it is trying to display, the renderer process may identify a webview tag or other construct that contains a browser plugin. When the renderer process identifies such a construct it may use process 300 to assign itself the role of embedder and cause the creation of another renderer process with the role of guest.

Figure 4:
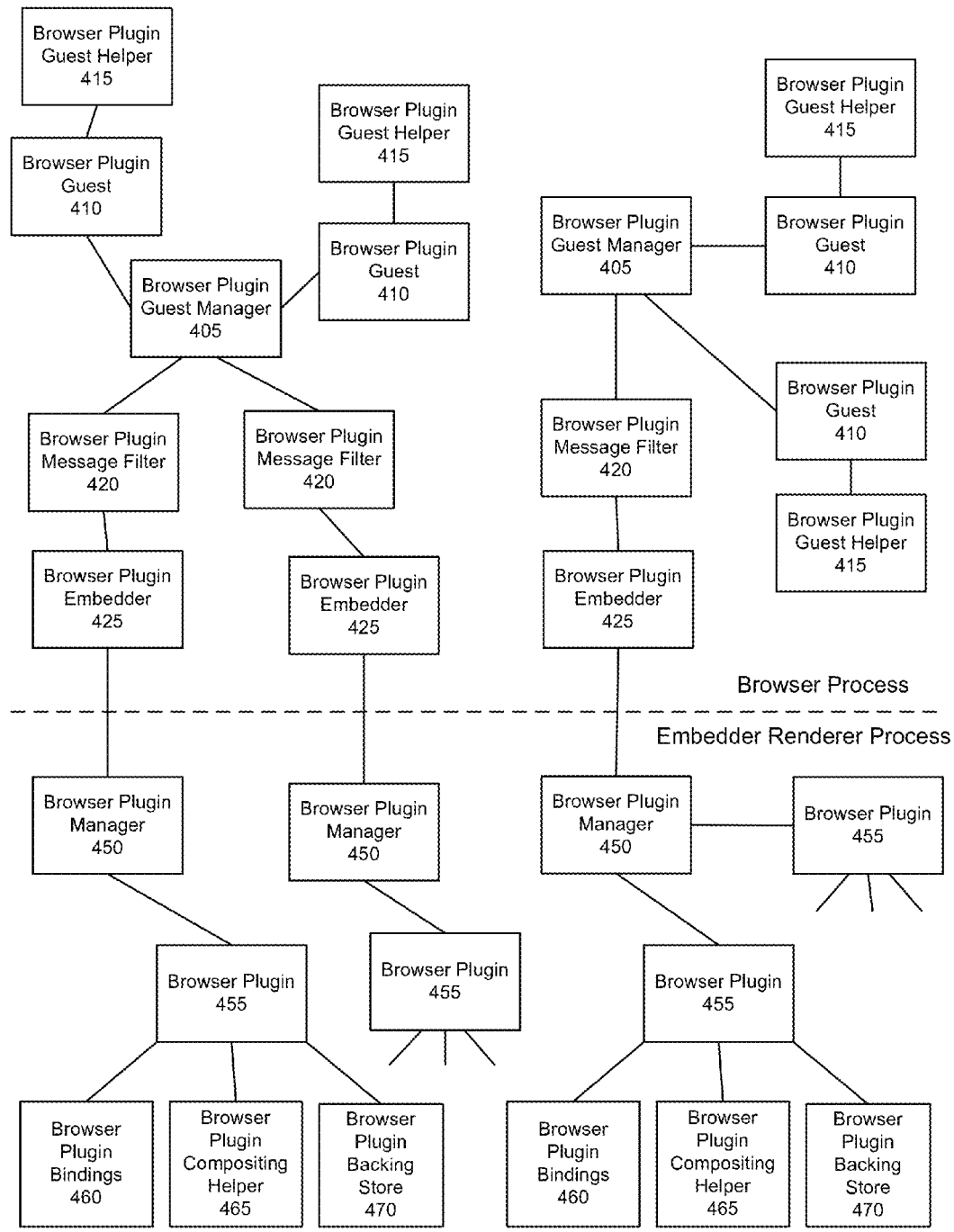
FIG. 4 is a data map of example objects used to create and communicate with a guest process in a multi-process, sandboxed browser.

For example, upon observing the request for a browser plugin (305), e.g., through a webview tag, the renderer process may generate a browser plugin object (310). Generation of the browser plugin object signals that the renderer process has taken on the role of an embedder. The browser plugin object enables the embedder to track, direct communications to, and receive communications from the guest process. Item 455 of FIG. 4 illustrates an example of a browser plugin object used by the embedder. The browser plugin object 455 is the main class and may interact with all other components on the embedder renderer process. The browser plugin object 455 may handle messages from the embedder process. The browser plugin object 455 may include fields to track information of guest, such as source, scale factor, crash status, size, auto size, transparency, storage limits, process/storage partition name, name used by window.open, targeted links, etc. The source may represent the uniform resource locator (URL) of the document currently displayed by the guest process. In some implementations, the scale factor may indicate the device independent pixel (DIP) scale factor of the embedder relative to a standard DIP device. This allows the embedder to display high-DIP guests correctly and support on-the-fly DIP switching within guests.

The browser plugin object 455 may maintain a browser plugin backing store 470 store for each embedded guest. The browser plugin backing store 470 may store a point-in-time copy of the shared memory buffer that the guest shared with the browser process. For example, browser plugin backing store 470 may correspond to plugin backing store 220 of FIG. 2. The browser plugin backing store 470 may be a wrapper around a bitmap that is used by the embedder renderer process in the software rendering path of the browser plugin. The backing store may be a local copy of a full frame of pixels of the guest. This allows changes in the layout of the embedder to be accomplished without accessing the guest process to get the pixels for the content of the browser plugin object 455. The browser plugin 455 may also have a browser plugin binding object 460. The browser plugin binding object may manage the method and property bindings associated with a browser plugin object 544. The browser plugin object 455 may also have a browser plugin compositing helper object 465. The browser plugin compositing helper object 465 may manage swapping of textures, gutter, and texture visibility for the accelerated compositing rendering path.

In addition to the browser plugin object 455, the system may create a browser plugin manager object 450. The browser plugin manager object 450 may manage the routing of messages to the correct browser plugin object 455 based on the instance id. For example, an embedder process may include more than one embedded guest. In such instances, the browser plugin manager 450 may route messages to one of the browser plugin objects 455 based on the instance id associated with the message.

The objects 450 to 470 of FIG. 4 are examples of objects that can be used by an embedder process to send communications to and receive communications from the guest process. Other objects or data structures may be used.

Returning to FIG. 3, at 315 the embedder may send a message to the browser process (315) that causes the browser process to fork a new guest process and initiate navigation to the guest process (320). In some implementations, the message to the browser may include information about a compositor thread for the embedder for use by a GPU process associated with the browser process. The compositor thread allows the embedder to render a frame using hardware assisted rendering, as will be discussed in more detail below with regard to FIG. 8. The browser process may also create objects to assist in the communication between the guest and the embedder processes (325). For example, the browser process may create objects such as objects 410, 415, 420, and 425 of FIG. 4.

A browser plugin guest helper object 415 may live on the UI thread of the browser process and intercept certain messages from the guest and direct them to a browser plugin guest object 410 rather than allowing the messages to be routed to default message handlers. In some implementations, the browser process may create a browser plugin guest object 410 for each guest process after receiving a message to create a guest process. The browser plugin guest object 410 may live on the UI thread of the browser process and may manage and handle messages going to and from guest processes. The browser plugin guest object 410 may enable the browser to manage the lifetime of guests. For example, the browser plugin guest object 410 may clean up a guest upon navigation or crashes, and may hide the guest when its embedder is hidden.

The browser process may also create a browser plugin message filter object 420 that lives on the I/O thread of the browser process. The browser plugin message filter object 420 may intercept input events from the embedder and relay them to the guest via the browser plugin guest manager object 405 on the UI thread. For example, the browser plugin message filter 420 may pass along the process ID of the embedder sending the message to the browser plugin guest manager object 405. The browser plugin guest manager 405 may subsequently determine whether the given embedder has access to the guest with the given instance id. The browser plugin guest manager object 405 may exist for each browser profile and for each browser application. The browser plugin guest manager object 405 may allocate profile or application wide instance identifiers so that two webviews in two different windows of the same application can script each other. In some implementations, the browser plugin guest manager object 405 may keep a mapping of the embedder process to the guest process to direct messages to the correct guest process. The browser plugin message filter object 420 may use a browser plugin embedder object 425. The browser plugin embedder object 425 may be associated with a browser process and handle messages that are specific to a given embedder window, such as a message to attach a new guest to a particular embedder. For example, the browser plugin manager 450 may communicate with the browser plugin embedder 425. The objects 405 to 425 of FIG. 4 are examples of objects that can be used to intercept and handle communications between the embedder and the guest processes. Other objects or data structures may be used.

Returning to FIG. 3, the browser process may generate entries in the objects generated to intercept and handle messages to/from the embedder and guest that map the embedder and guest processes (330). For example, browser plugin guest manager 405 may keep track of the browser plugin instance IDs of the guest's embedder so the browser plugin guest manager 405 may direct messages to the correct browser plugin object 455. In another example, the browser plugin message filter object 420 may track the instance IDs of the guest and embedder to ensure messages are relayed to the appropriate process. The browser plugin guest manager 405 may update the mapping in the browser plugin message filter object 420 when needed. Thus, objects used by the browser process help it map the embedder process to its guest process. The mapping at the browser level enables the guest process to run without knowledge that it is an embedded object. These are two examples of mapping the embedder to the guest and other objects or data structures may be used to accomplish the mapping.

After generating the mapping, the browser process may then act as the intermediary for communications between the embedder and the guest processes. Examples of such communication will be discussed in more detail below with regard to FIGS. 5-8. At some later point in time, depicted in FIG. 3 as a dashed line, the browser process may detect that the guest process has crashed, my detect a refresh of the embedder, or may detect navigation away from the document that included the webview tag (335). Any of these events may cause the browser process to terminate the guest process (340). For example, the browser process may destroy the objects created in steps 325 and 330 and, if appropriate, notify the embedder process. For example, if the guest has crashed, the browser process may notify the embedder that the guest has been terminated. When an embedder is informed about the crash of its guest, the embedder may turn on a flag. When the crash flag is set the embedder may no longer forward events, such as input, resize, or postMessage for the guest. The embedder may also reset the source attribute of the guest and/or destroy the objects created in step 310. In some implementations, the embedder may paint an image for the guest portion of the embedder content area that indicates that the guest crashed. The browser process may determine that the guest process, or any renderer process, has crashed if the process fails to return an acknowledgement after a predetermined time has elapsed since the browser process sent a message to the process.

Alternatively, the embedder process may determine that the webview tag no longer appears in a web page it is rendering (345). When this occurs, the embedder may destroy the objects created in step 310 to communicate with the guest (350) and may send a message to the browser indicating that the browser process should kill the guest as described above with regard to step 340. Thus, process 300 demonstrates the creation and destruction of a guest process in a sandboxed, multi-threaded browser environment.

Figure 5:
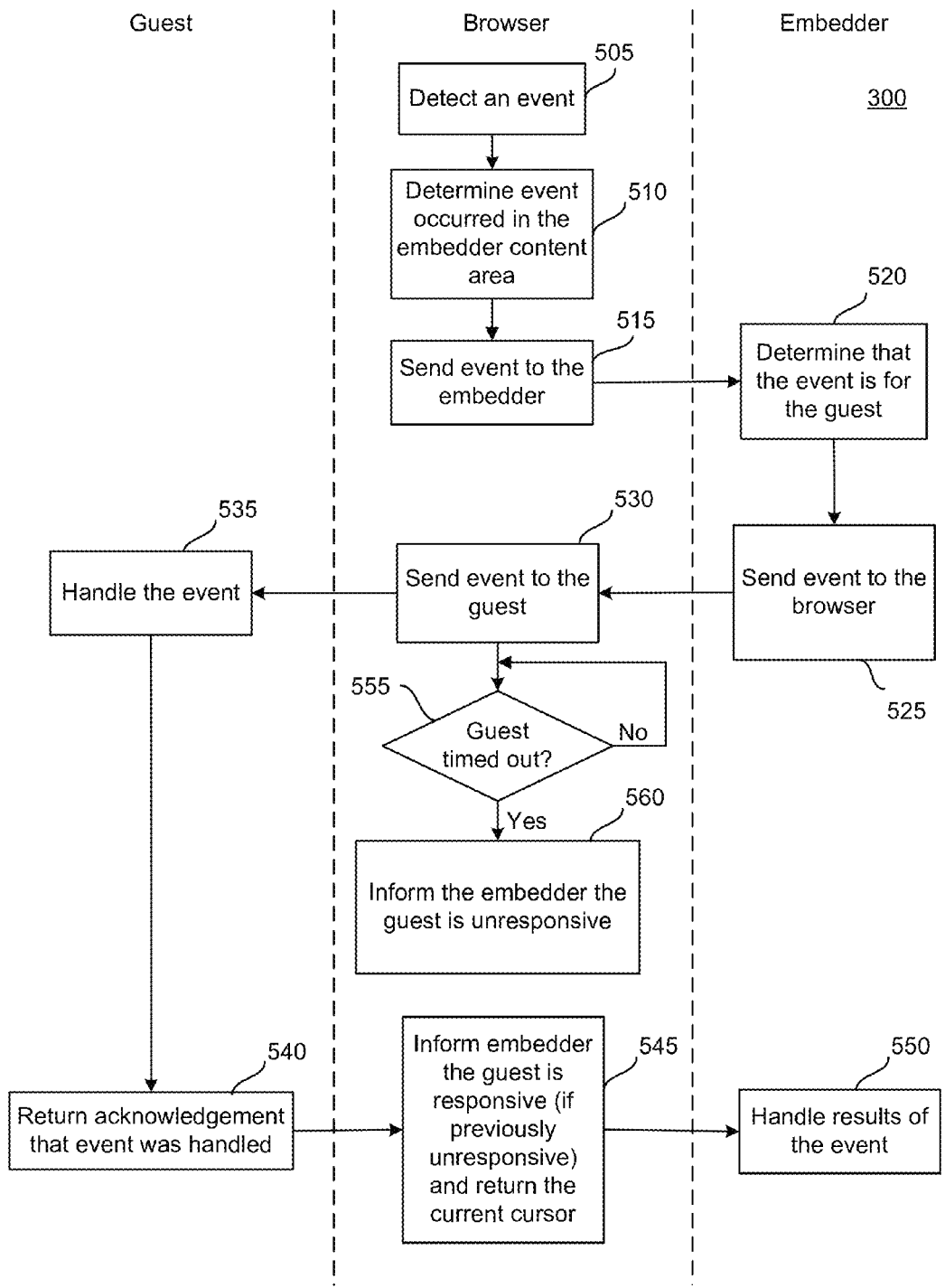
FIG. 5 is a flowchart of a process for handling an event that occurs in the guest window of a multi-process, sandboxed browser.

FIG. 5 is a flowchart of a process 500 for handling an event that occurs in the guest portion of the browser window. Process 500 demonstrates how the browser process acts as an intermediary for communication between the guest process and the embedder process. In a multi-process browser, events occur on the UI thread, so the browser process receives the event first (505). When the browser detects the event, it will forward the event to the renderer process that corresponds to the content area or frame the event occurred in. Because the embedder process corresponds with the frame that receives events for the guest process, the browser determines that the event occurred in the embedder's content area (510) and sends the event to the embedder process (515). The embedder process may determine that the event is actually destined for the guest process (520). For example, the embedder process may determine that the event is destined for the guest process based on where in the screen the event happened or what object the event is associated with.

Once the embedder process has determined that the event is destined for the guest, it may send a message to the browser process that tells the browser process the event is to be handled by the guest process (525). In some implementations, for example, those using synchronous events, the embedder process may be blocked from handling further messages until receiving a response from the browser process. In other implementations, for example those using asynchronous events, the embedder process is not blocked. The browser process may forward the event to the guest process (530). The browser process may use normal communication channels to forward the event to the guest process. The guest process may receive the event and proceed to handle the event (535). Handling the event depends on the type of event, e.g., mouse click, drag, text entry, etc. When the guest process has finished handling the event, the guest process may send an acknowledgement to the browser process (540). The browser process may receive the acknowledgment. In some implementations, process 500 ends because the embedder does not need to know that the guest handled the event. In some implementations, the browser process may return the current cursor to the embedder process (545). The embedder may then handle the results of the event (550). For example, the embedder may update the information displayed in the tab or window, including repainting the guest portion of the content area.

Returning to step 530, after sending the event to the guest the browser process may start a timer to determine whether a predetermined amount of time has passed since the browser process forwarded the event (555). If the predetermined amount of time elapses before the browser process receives the acknowledgment from the guest process (555, Yes), the guest process may be considered hung, or timed out. If the guest process times out, the browser process may consider it crashed and kill the guest process, unblock the embedder process if blocked, and inform the embedder process about the crash (560), as described above. Using the browser process to time the guest process enables the embedder process to keep running even if its guest crashes.

Figure 6:
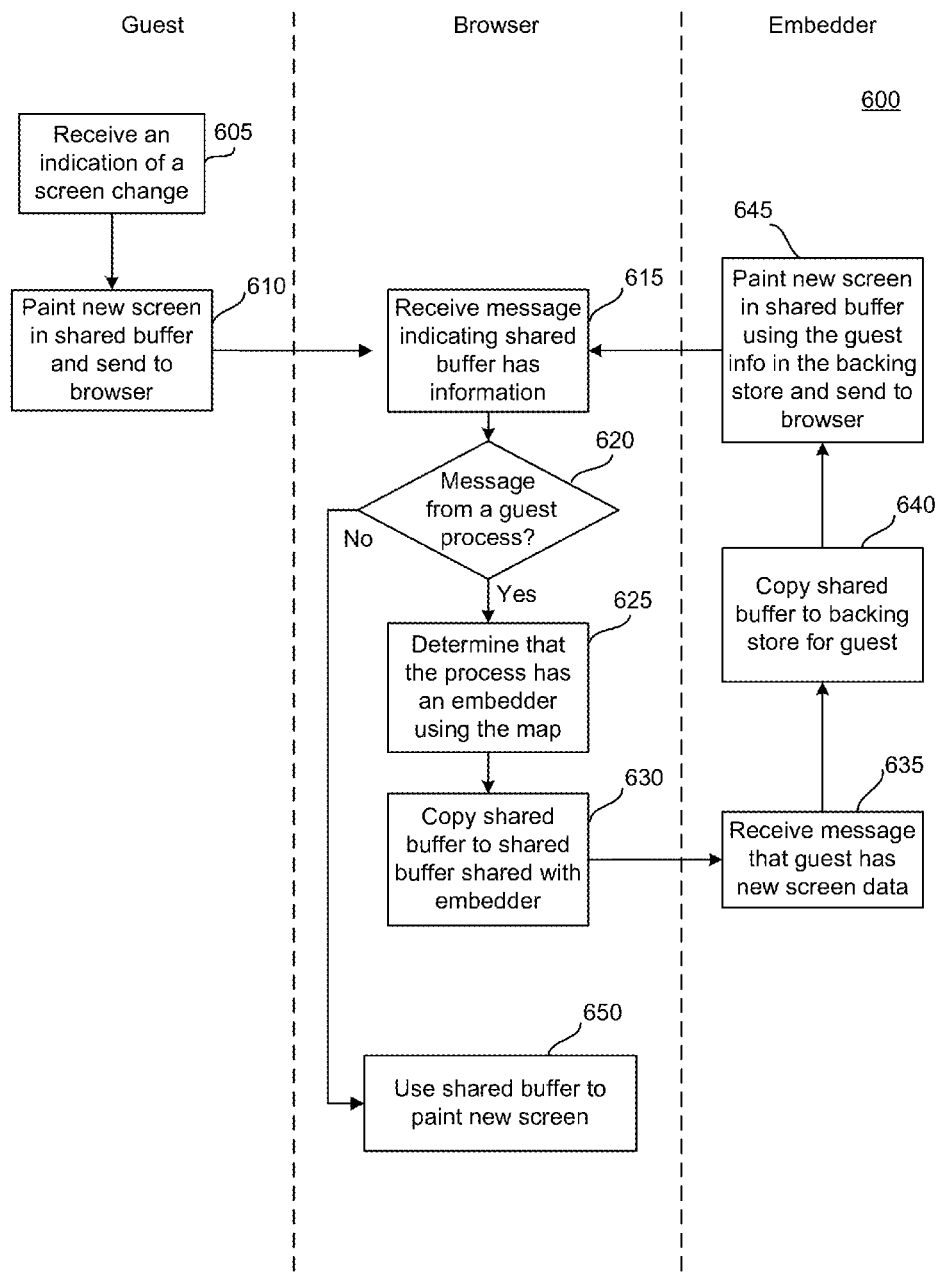
FIG. 6 is a flowchart of a process for using software assisted rendering to paint a guest window inside of an embedder frame of a multi-process browser window.

FIG. 6 is a flowchart of a process for using software assisted rendering to render or paint a guest area inside of an embedder content area. Painting may occur as part of handling an event, such as clicking a check-box, selecting a link, scrolling the window, or resizing the guest window. For example, process 600 may occur as part of step 535 of FIG. 5. While handling a particular event, the guest process may receive an indication of a screen change for its display (605). The guest process may proceed to paint the new screen to an area of memory shared between the guest process and the browser process (610). This shared area of memory may be referred to as a shared memory buffer, such as Buffer 4 of FIG. 2. When the guest process has finished painting the display information to its shared memory buffer, the guest process may send a message to the browser process that indicates the shared memory buffer has information that is ready to be rendered on the display device.

When the browser process receives the message (615), it may determine that the message is from a guest process (620, Yes) and use a mapping of the guest process to its embedder process to determine the embedder process associated with the guest process (625). The browser process may then copy the information from the guest-browser shared memory buffer, e.g., Buffer 4 of FIG. 2, to a buffer shared with the embedder process (630), e.g., Buffer 3 of FIG. 2, and send a message to the embedder indicating that the guest has provided information for display. The embedder process may receive the message (635) and may copy the information in the buffer it shares with the browser process to a plugin backing store, or another area of memory (640). The backing store may have been allocated as part of the objects created in step 310 of FIG. 3, and may be represented by plugin backing store 220 of FIG. 2. The embedder process may then use the display information in the backing store to write display information in the buffer the embedder process shares with the browser process (645). The display information in this shared memory buffer may include the display information needed to display items for the embedder process as well as the display information from the guest process. When the embedder process has completed painting the display information to the shared memory buffer, the embedder process may notify the browser process that the shared memory buffer has information that needs to be rendered on the display device. When the browser process receives this message (615) and determines that the message is not from a guest (620, No), the browser process may use the information in the buffer it shares with the embedder render the browser window (650). Using process 600 the embedder may obtain the information it needs from the guest process to embed the guest display in its content area while still remaining sandboxed from the guest process.

Figure 7:
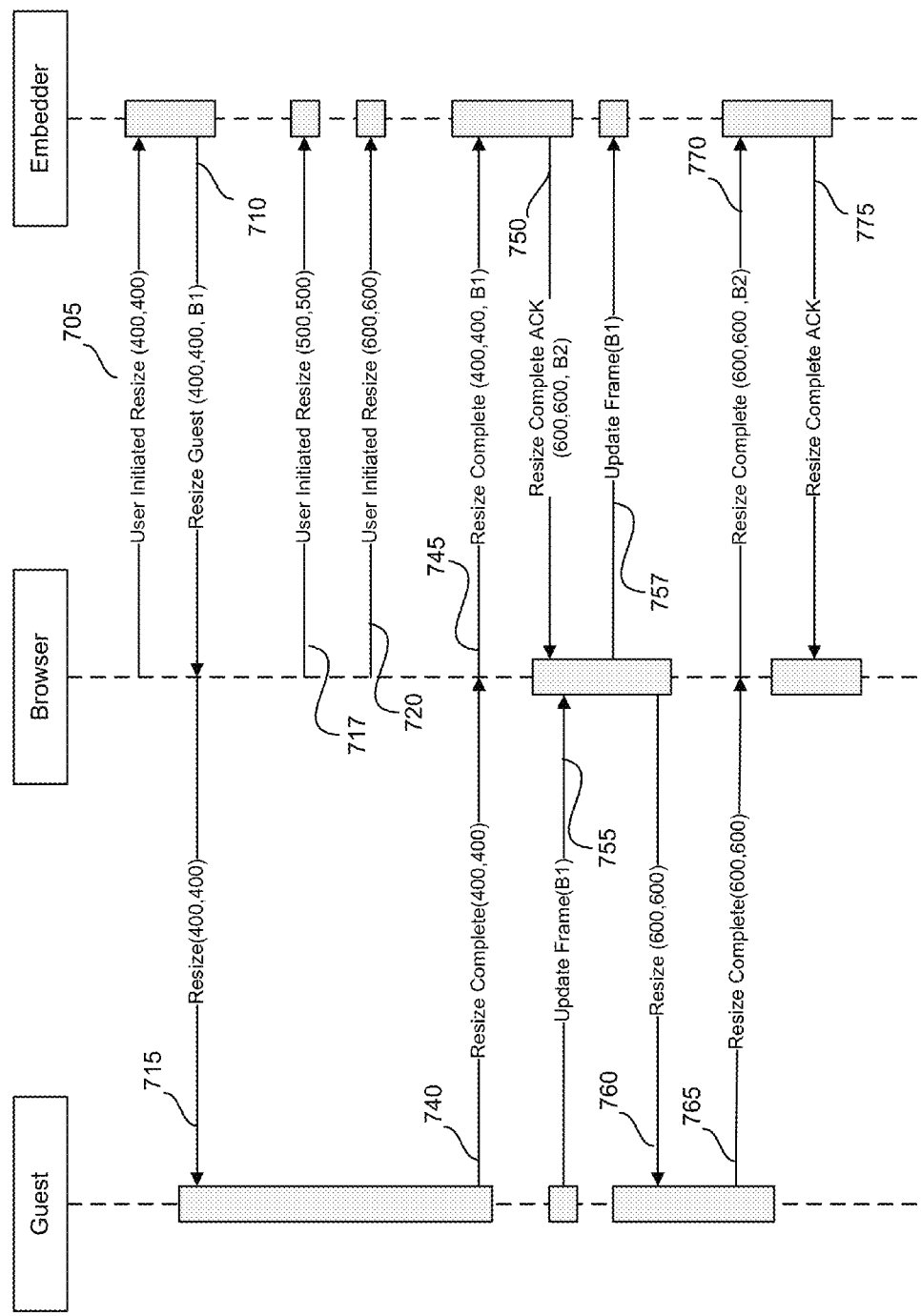
FIG. 7 is a flow diagram of messages in a resize event of a guest window inside of an embedder frame in a multi-process browser window.

FIG. 7 is a flow diagram of messages used in a resize of a guest window inside of an embedder frame. FIG. 7 illustrates an example of asynchronous event handling with the browser process acting as an intermediary between the embedder process and the guest process. In the example of FIG. 7, the browser process receives a resize directed to the guest process. The browser process sends 705 the resize to the embedder process, which determines that the resize is intended for the guest process. Although the example of FIG. 7 illustrates a resize initiated through the browser process, in some implementations the embedder process may initiate the resize. In such implementations, step 705 is optional. The embedder process notifies 710 the browser process that the resize is for the guest. In some implementations, the embedder process may create a current damage buffer. The damage buffer may be a shared memory buffer that the embedder process and the browser process can both access. The embedder process may assign a sequence identifier to the current damage buffer and send the identifier to the browser process with the resize request. In the example of FIG. 7, the current damage buffer is B1. In the example of FIG. 7, the browser process forwards 715 the resize to the guest process and the guest process proceeds to handle the resize.

In the meantime, the browser process may receive another resize request intended for the guest process. Because the browser process only knows that the resize occurred in the content area associated with the embedder process, the browser process may send 717 this is resize to the embedder process. The embedder process determines that the resize is destined for the guest. Because the embedder has not received an acknowledgement from the guest for the first resize, the embedder may ignore this resize until it sees an acknowledgement for the pending resize request. Thus the embedder process may not forward this resize request to the browser process because it has not received an acknowledgement from the guest. In the example of FIG. 7, the browser process may receive another resize while the guest is still handling the first resize. The browser process may send 720 the resize request to the embedder process and the embedder process may determine that the resize is destined for the guest. The embedder process may again ignore this resize request until it sees an acknowledgement for the pending resize request.

When the guest process finishes handling the resize, the guest process may notify 740 the browser process. In some implementations, the guest process may have written the resize information into a buffer it shares with the browser process. The browser process may forward 745 the message to the embedder process. In some implementations, as part of forwarding the message the browser process may copy the information in the buffer shared with the guest process to the damage buffer identified in the original resize message, buffer B1 in the example of FIG. 7. The embedder may determine that the resize request acknowledged by the guest process does not match the most recent resize request. For example, the embedder process may compare the size in the message from the browser process with the size of the most recently received resize request. When the two do not match, the embedder process may create a pending damage buffer with a new sequence number and send 750 another message to the browser that causes the browser to send 760 another resize request to the guest. The new message may include sequence number of the pending damage buffer.

In the meantime, the guest process may update its frame 755. The browser process may notify the embedder process of the updated frame 757. Because the update frame message identifies the current buffer B1 and not the pending damage buffer B2, the embedder process may ignore this request.

The guest may process this second resize request and send 765 an acknowledgement to the browser process. The browser process may copy the damage buffer from the guest to the damage buffer identified in the resize request from the embedder, namely B2. This acknowledgement is forwarded 770 to the embedder process. The embedder process may determine that the sequence identifier of the damage buffer matches the pending damage buffer. Once the embedder sees that the browser process is writing damage to the pending damage buffer, it may discard the current damage buffer, e.g., B1, and mark the pending damage buffer as the current damage buffer. In some implementations, the embedder process may copy the contents of the damage buffer to a backing store and may use the contents to paint new screen data into the buffer it shares with the browser process. When the embedder process finishes, it may acknowledge the resize by sending 775 an acknowledgement to the browser process. The browser may copy the contents of the buffer it shares with the embedder process to its own backing store and proceed to provide the resized screen in the embedder's content area.

Figure 8:
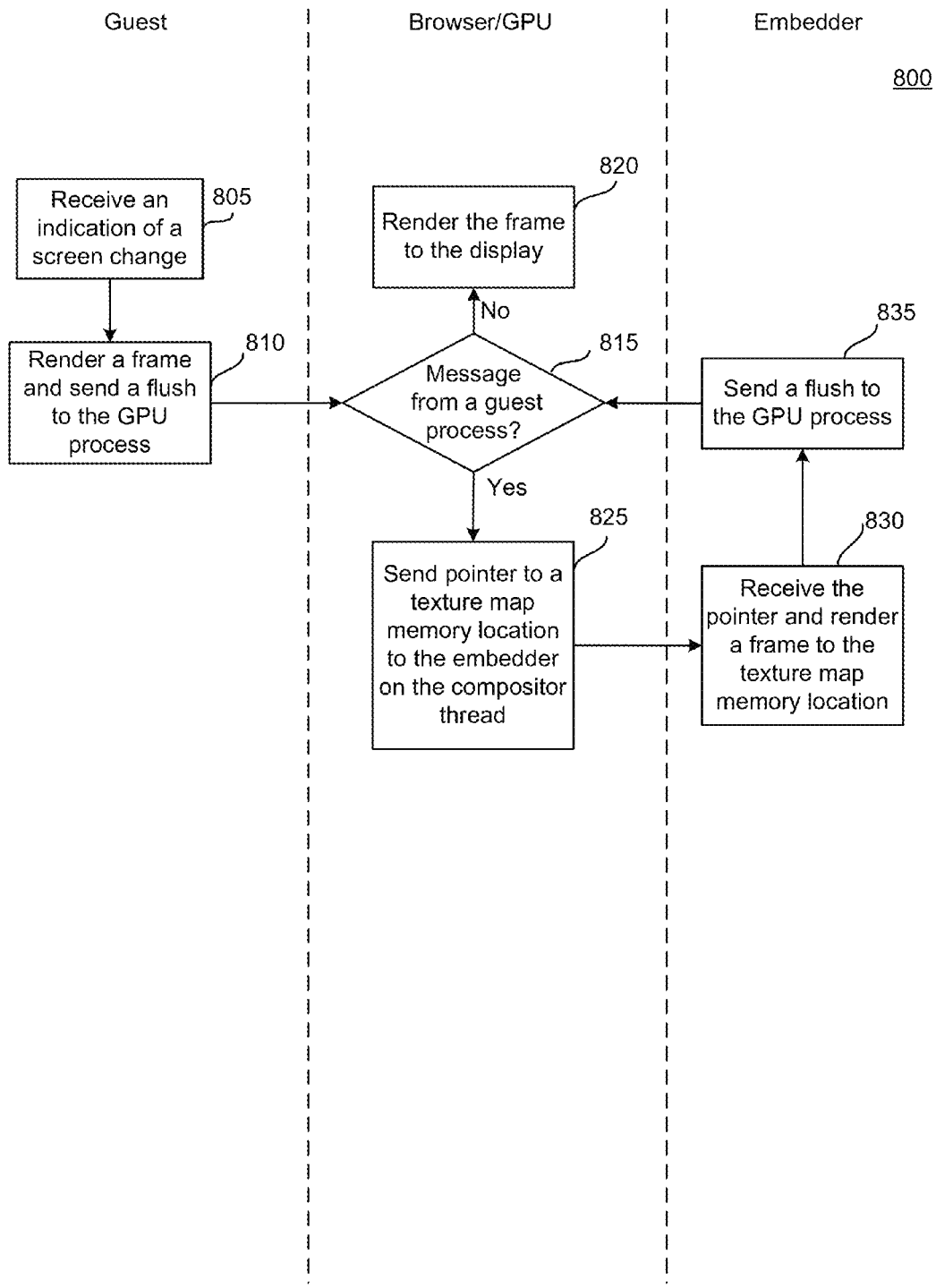
FIG. 8 is a flowchart of a process for using hardware assisted rendering to paint a guest window inside of an embedder frame of a multi-process browser window.

FIG. 8 is a flowchart of a process 800 for using hardware assisted rendering to paint a guest window inside of an embedder frame of a browser window. For computing systems that include a graphics card with a graphics processing unit (GPU), the browser may also include a GPU process that helps the browser process render information to the display. The GPU process may ensure that all compositing commands are executed serially and manage scheduling to prevent any renderer processes from monopolizing a resource. The GPU process may use a compositor thread instead of the main thread. When using hardware assisted rendering to render a content area, the renderer process paints a texture map. The texture map is an image or frame created somewhere besides the display or screen. The texture map is often created in a memory of the computing device.

As part of an event, the guest process may receive an indication of a screen change (805). The guest process may write the new screen data to the texture map and send a message to the GPU process indicating that the texture map is ready for display (810). This message may also be referred to as a flush. The GPU process may determine whether the flush came from a guest process or not. If so (815, Yes) the GPU process may send a token that identifies the texture map generated by the guest process to the embedder process (825). The GPU process may use the compositor thread of the embedder process to send the token. The embedder process may use the token to render a frame to the texture map (830). This may include modifying the texture map to include display information needed for the embedder content. When the embedder process is finished writing to the texture map, the embedder process may send a flush to the GPU process using the compositor thread (835). The embedder process may use the compositor thread to handle the swap message without touching the render thread, thus avoiding deadlocks. Without a second thread, a deadlock situation may occur if the embedder attempts to send an input event to the guest while the guest issues a flush to the GPU. In this situation, the guest would be waiting for acknowledgement of the flush before handling the input, while the embedder would be waiting for acknowledgement of the input before handling the flush. Using the compositor thread, the embedder can handle the flush without touching the render thread. The GPU process may determine that the flush did not come from a guest process (815, No) and use the texture map to render the image on the display (820). Thus, when using hardware assisted rendering for rendering, the GPU process may act as an intermediary for notifying the embedder process of render events for the guest.

Figure 9:
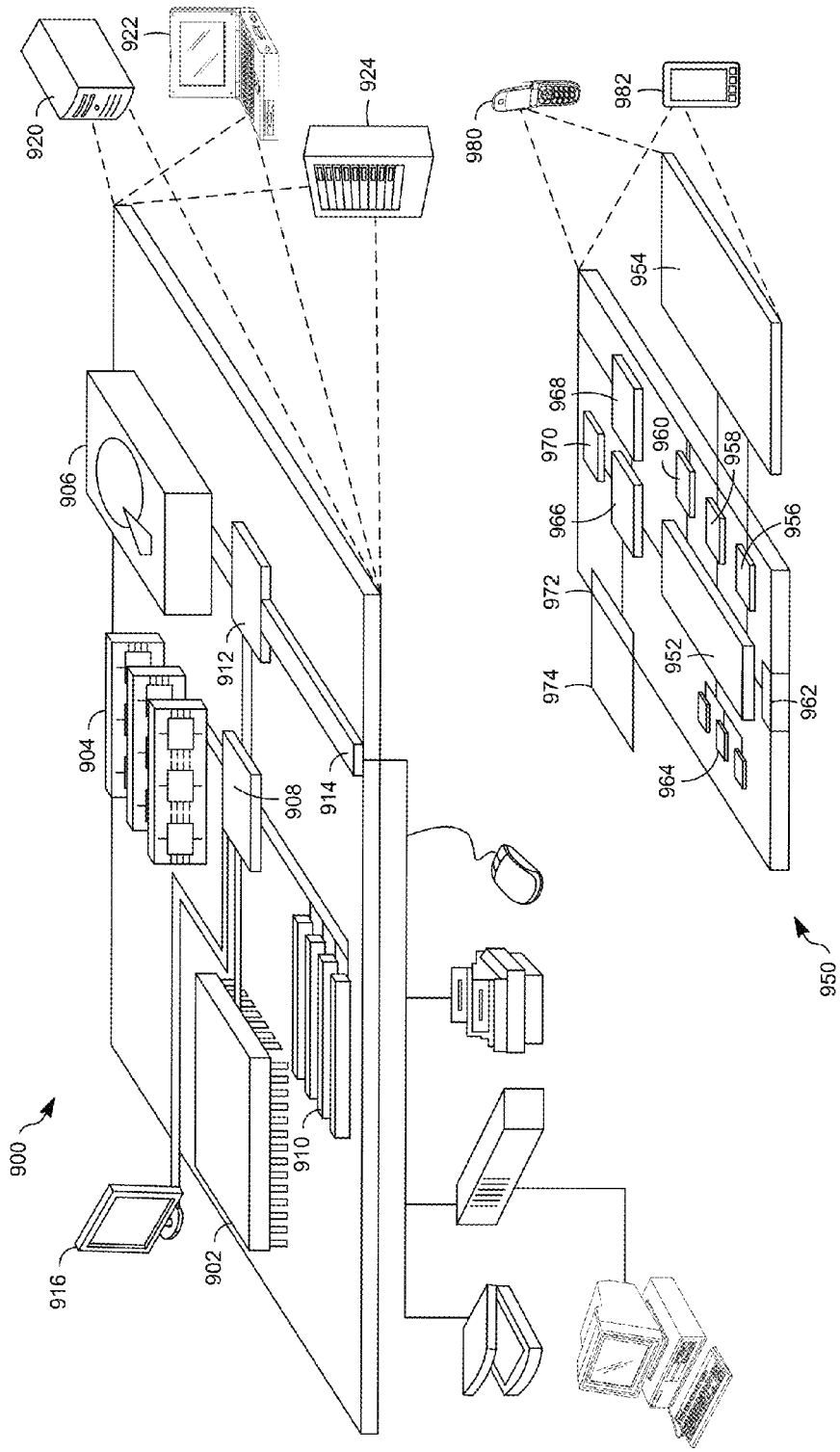
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, televisions with at least one processor, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 950. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   at least one processor;
   a memory;
   a display device; and
   instructions, stored in the memory, that when executed by the at least one processor cause the computing device to perform operations comprising:
   running a browser process, the browser process generating data used to display a window on the display device, and
   running one or more renderer processes, the renderer processes being forked and controlled by the browser process, one of the renderer processes being an embedder process associated with a guest process, the guest process being another one of the renderer processes and the guest process being unaware of the embedder process, wherein the renderer processes have storage isolation with respect to each other and each renderer process that is not the guest process has a respective content area in the window, a content area displaying output generated by a respective rendering process, and wherein the browser process acts as an intermediary for communications between the guest process and the embedder process so that output from the guest process is included in the content area for the embedder process while maintaining storage isolation.

2. The computing device of claim 1, the instructions further including instructions that cause the computing device to perform operations comprising:

detecting, by the browser process, an event for the embedder process;
 sending a message from the browser process to the embedder process notifying the embedder process of the event;
 determining, by the embedder process, that the event is destined for the guest process and, in response, sending the event to the browser process; and
 forwarding, by the browser process, the event to the guest process.

3. The computing device of claim 2, the instructions further including instructions that cause the computing device to perform operations comprising:

handling the event at the guest process and returning an acknowledgement to the browser process; and
 sending a message from the browser process to the embedder process indicating that the guest handled the event.

4. The computing device of claim 2, the instructions further including instructions that cause the computing device to perform operations comprising:

determining, by the browser process, whether a predetermined amount of time has elapsed since forwarding the event to the guest process without receiving an acknowledgment;
 terminating the guest process when it is determined that the predetermined amount of time has elapsed; and
 sending a message from the browser process to the embedder process notifying the embedder process that the guest was terminated.

5. The computing device of claim 2, wherein the event includes changing information for display and handling the event includes:

writing, by the guest process, first display information to a first area of memory shared between the guest process and the browser process;
 copying, by the browser process, the first display information from the first area of memory to a second area of memory shared by the browser process and the embedder process;
 writing, by the embedder process, second display information to the second area of memory, the second display information including the first display information and notifying the browser process that the second area of memory is ready for display; and
 providing, by the browser process, the second display information to the display.

6. The computing device of claim 2, further comprising:
 a graphics processing unit (GPU); and
 instructions, stored in the memory, that cause the computing device to run a GPU process, wherein the event includes changing information for display and handling the event includes:

writing, by the guest process, first display information to a texture map shared between the guest process and the GPU process,
 sending a message from the guest process to the GPU process indicating that the texture map is ready for display,
 sending, by the GPU process, a token identifying the texture map to the embedder process,
 modifying, by the embedder process, the texture map to include second display information,
 sending a message from the embedder process to the GPU process indicating that the texture map is ready for display, and
 providing the second display information to the display.

7. The computing device of claim 1, wherein the browser process maintains a mapping between the embedder process and the guest process to facilitate the communications.

8. The computing device of claim 7, wherein the browser process uses the mapping to notify the embedder process when the guest process has crashed so that the embedder process continues to run regardless of the crash of the guest process.

9. A computer-implemented method executed by at least one processor performing operations for a web browser running a browser process and at least a first renderer process on a computing system, the method comprising:

identifying a tag in a first web page that causes the web browser to embed a second web page within the first web page, the first web page being displayed in a tab associated with the first renderer process;
 forking a second renderer process responsive to identifying the tag, wherein the first renderer process and the second renderer process have storage isolation;
 generating a mapping between the first renderer process and the second renderer process at the browser process, the second renderer process being unaware of the mapping or the existence of the second renderer process; and
 using the browser process as an intermediary for communications between the first renderer process and the second renderer process based on the mapping, so that output from the second renderer process is included in the tab for the first renderer process while maintaining storage isolation.

10. The method of claim 9, wherein using the browser process for communications comprises:

sending first display data from the second renderer process to the browser process;
 using the mapping to determine that the second renderer process is mapped to the first renderer process;
 sending the first display data from the browser process to the first renderer process;
 incorporating the first display data into second display data at the first renderer process;
 sending the second display data to the browser process; and
 using the second display data to generate the tab in a display device.

11. The method of claim 10, wherein using the browser process for communications further comprises:

determining, at the browser process, that the second renderer process has crashed;
 killing the guest process; and
 notifying the first renderer process of the crash.

12. The method of claim 9, wherein using the browser process for communications comprises:

generating, by the second renderer process, first display data in a particular memory location;

using the mapping to determine that the second renderer process is mapped to the first renderer process;

sending a token identifying the particular memory location to the first renderer process;

using the token, by the first renderer process, to modify the particular memory location with second display data; and using the particular memory location to generate the tab in a display device.

13. The method of claim 12, the sending of the token occurring on a compositor thread associated with the first renderer process.

14. The method of claim 9, wherein using the browser process for communications comprises:

receiving an event at the browser process;

sending the event to the first renderer process;

determining that the event is directed to the second renderer process;

sending the event to the browser process for forwarding to the second renderer process;

handling the event at the second renderer process;

sending an acknowledgement including first data from the second renderer process to the browser process; and sending the first data from the browser process to the at least one first renderer process.

15. The method of claim 14, the first data including a cursor determined by the second renderer process.

16. A non-transitory computer-readable medium containing instructions executable by at least one processor, the instructions causing at least a first renderer process and a browser process running on a computing system to perform operations comprising:

identifying a tag in a first web page that embeds a second web page within the first web page, the web page being displayed in a tab associated with the first renderer process;

forking a second renderer process responsive to identifying the tag, wherein the first renderer process and the second renderer process have storage isolation;

generating a mapping between the first renderer process and the second renderer process at the browser process, the second renderer process being unaware of the mapping or the existence of the second renderer process; and using the browser process as an intermediary for communications between the first renderer process and the second renderer process based on the mapping, so that output from the second renderer process is included in the tab for the first renderer process while maintaining storage isolation.

17. The computer-readable medium of claim 16, wherein using the browser process for communications comprises:

sending first display data from the second renderer process to the browser process;

using the mapping to determine that the second renderer process is mapped to the first renderer process;

sending the first display data from the browser process to the first renderer process;

incorporating the first display data into second display data at the at first renderer process; and sending the second display data to the browser process.

18. The computer-readable medium of claim 16, wherein using the browser process for communications comprises:

receiving an event at the browser process;

sending the event to the first renderer process;

determining that the event is directed to the second renderer process;

sending the event to the browser process for forwarding to the second renderer process;

handling the event at the second renderer process;

sending an acknowledgement including first data from the second another renderer process to the browser process; and sending the first data from the browser process to the at least one first renderer process.

19. The computer-readable medium of claim 16, wherein using the browser process for communications comprises:

generating, by the second renderer process, first display data in a particular memory location;

using the mapping to determine that the second renderer process is mapped to the first renderer process;

sending a token identifying the particular memory location to the first renderer process;

using the token, by the first renderer process, to modify the particular memory location with second display data; and using the particular memory location to generate a window in the tab.

20. The computer-readable medium of claim 19, wherein the window is a window from a browser application that looks like a native application.

* * * * *

UNITED STATES PATENT AND TRADEMARK OFFICE
CERTIFICATE OF CORRECTION

PATENT NO. : 9,070,211 B1
APPLICATION NO. : 13/841210
DATED : June 30, 2015
INVENTOR(S) : Robert John Kroeger et al.

Page 1 of 1

It is certified that error appears in the above-identified patent and that said Letters Patent is hereby corrected as shown below:

In the claims

In column 21, lines 26-27, in claim 14, delete "process to the at least one first" and insert --process to the first-- therefor.

In column 22, line 13, in claim 17, delete "at the at" and insert --at the-- therefor.

In column 22, line 25, in claim 18, delete "second another renderer" and insert --second renderer-- therefor.

In column 22, lines 27-28, in claim 18, delete "to the at least one first" and insert --to the first-- therefor.

Signed and Sealed this
Twenty-fourth Day of November, 2015

Michelle K. Lee
*Director of the United States Patent and Trademark Office*